United States Patent [19]

Hesp

[11] Patent Number: 5,683,498
[45] Date of Patent: Nov. 4, 1997

[54] PROCESS FOR PREPARING RUBBER-MODIFIED ASPHALT COMPOSITIONS

[76] Inventor: Simon Adrianus Maria Hesp, 501-670 Sir John A. Macdonald Blvd., Kingston, Ontario K7M 1A3, Canada

[21] Appl. No.: 662,334

[22] Filed: Jun. 12, 1996

Related U.S. Application Data

[63] Continuation-in-part of Ser. No. 282,462, Aug. 1, 1994, abandoned.

[51] Int. Cl.$^6$ .................................................. C08L 95/00
[52] U.S. Cl. .................. 106/273.1; 106/274; 404/75; 404/77; 521/41; 521/45.5; 525/54.5
[58] Field of Search .................. 106/273.1, 274, 106/DIG. 7; 404/75, 77; 525/54.5; 521/40, 40.5, 41, 45.5

[56] References Cited

U.S. PATENT DOCUMENTS

| | | | |
|---|---|---|---|
| 3,700,615 | 10/1972 | Scott | 260/2.3 |
| 3,891,585 | 6/1975 | McDonald | 404/32 |
| 4,018,730 | 4/1977 | McDonald | 106/277 |
| 4,068,023 | 1/1978 | Nielson et al. | 427/138 |
| 4,069,182 | 1/1978 | McDonald | 404/74 |
| 4,211,676 | 7/1980 | Watabe et al. | 260/2.3 |
| 5,304,576 | 4/1994 | Martinez | 521/41 |
| B1 3,891,585 | 11/1989 | McDonald | 521/44.5 |

FOREIGN PATENT DOCUMENTS 9414896  7/1994  WIPO.

*Primary Examiner*—Paul Marcantoni
*Attorney, Agent, or Firm*—Ridout & Maybee

[57] ABSTRACT

A modified asphalt composition having improved low-temperature fracture properties is obtained by devulcanizing crumb rubber, preferably ground rubber tire. The devulcanization is effected without the use of harsh oxidizing treatments or the addition of potentially hazardous solvents, by fractional distillation of a mixture of the rubber and crude oil to a temperature at which substantially complete devulcanization occurs and harmful volatiles are driven off, around 300° C. The resulting compositions are relatively inexpensive and simple to produce and, not having been oxidized, may be expected to show better long-term aging and fatigue performance compared to air-blown asphalts and the like. They are also preferable, on grounds of health and safety, to prior paving asphalts containing significant proportions of volatile organic aliphatic or aromatic hydrocarbons.

6 Claims, No Drawings

PROCESS FOR PREPARING RUBBER-MODIFIED ASPHALT COMPOSITIONS

RELATED APPLICATIONS

This application is a continuation-in-part of patent application Ser. No. 08/282,462, filed Aug. 1, 1994, now abandoned, and entitled "Process for Preparing Rubber-modified Asphalt Compositions".

BACKGROUND OF THE INVENTION

This invention relates to rubber-modified asphalt paving compositions.

Various approaches have been taken to solubilizing or compatibilizing rubber or other polymers in conventional paving grade asphalt, with a view to improving the resistance and durability of the pavement to which the asphalt composition is applied.

For over twenty-five years, rubber from discarded tires has been introduced into asphalt binders in order to improve the low and high temperature performance of the binder and in the binder-aggregate mixes used in paving.

The development of rubber-modified asphalt pavements has also been driven by environmental and political advocacy for the reduction of North America's huge stockpile of discarded rubber tires by incorporation into "linear landfills", i.e., asphalt roads. In 1991, the government of the United States passed legislation. [The Intermodal Surface Transportation Efficiency Act (ISTEA) of 1991 (Sec. 1038)] forcing State governments to use waste rubber tires in pavement projects supported by federal funds, commencing in 1994. Implementation of this law has been postponed for one year, and its future status as at the date of filing of the present application is uncertain. However, it is generally expected that the Act will eventually come into force without significant change. The legislation would require that, by 1997 (or, perhaps, some further deferred deadline), all States receiving such government funding should use approximately 15% rubber tire waste on the asphalt binder in 20% of their projects in order to remain eligible for such government support.

Not surprisingly, the law has been a strong incentive for significant research and development efforts toward the preparation of rubber-modified asphalts. The simple mixing with asphalt of rubber from discarded tires is unsatisfactory, because of eventual phase separation of the cross-linked (vulcanized) rubber from the binder during storage or transport.

Homogeneous rubberized asphalt paving compositions have been made by heating asphalt-granulated rubber mixtures to a "jellied" composition and adding a small proportion of a light hydrocarbon solvent, said to reduce viscosity to a degree and for a sufficient period of time to permit application of the mixture to a roadway. See U.S. Pat. No. 3,919,148 (Winters, et al.). In a related method employing solvents, said to be more dependable and less inherently hazardous than the use of kerosene and other light hydrocarbons, an asphaltic component is blended with 1-20% of a highly aromatic, high-boiling, high-flashpoint mineral oil. To that mixture is added a reclaimed rubber component of roughly equal parts of vulcanized natural rubber and devulcanized rubber. A homogeneous composition results from heating and agitating the mixture for a suitable time at 300°–500° F. (150°–260° C.). See U.S. Pat. No. 4,068,023 (Nielsen, et al.).

Methods for incorporating rubber in asphalt by means of the addition of low molecular weight solvents or aromatic oils are, however, to varying degrees costly and of questionable environmental impact.

Devulcanized rubber-asphalt systems possess the requisite long term storage stability at high temperatures. According to a known process for preparing a devulcanized rubber-asphalt system, a mixture of asphalt binder and ground rubber tire (crumb rubber) is prepared and then vigorously heated and agitated in the presence of oxygen and free radical initiators, thereby devulcanizing the rubber component. This produces a paving mixture sometimes referred to as an "air-blown" asphalt. The known process is described in U.S. Pat. No. 3,700,615 (Scott).

Variations of the air-blowing process for producing storable modified asphalt compositions are disclosed in German Offenlegungsschrift 3819931 Al of Dec. 14, 1989 (Hoehr et al.), German patent DE 1594756 of Dec. 13, 1973 (Schmidt et al.) and in International Publication WO 93/17076 of Sep. 2, 1993 (Bitumar R&D). A commercially available homogeneous asphalt binder made generally according to the teachings of WO 93/17076 is distributed under the name ECOFLEX™.

In the ECOFLEX™ process, crumb rubber is mixed with asphalt and the binder is subsequently heated for up to five hours at 220°–260° C. while compressed air is blown through in order to break down the rubber and facilitate dissolution. However, measurements conducted by the present inventors showed samples of ECOFLEX™ modified asphalt binder (obtained from Bitumar Inc. of Montreal, Quebec) to be only marginally better in fracture toughness than unmodified asphalt of a similar paving grade (Bow River 85–100 Penetration Grade Asphalt). It is also well known to those in the paving industry that air-blown asphalts in general possess poor long-term aging and fatigue properties.

We have discovered that a relatively inexpensive, safe and effective paving composition having improved properties and requiring no alterations to the paving process itself can be obtained by devulcanizing crumb rubber through the fractional distillation of a mixture of rubber and crude oil. The devulcanized rubber-containing residue of this distillation process is then diluted with commercially available asphalt binder to produce a homogeneous paving composition with a selected proportion of dissolved rubber between 3% and 40%. Crude oil naturally contains low molecular weight hydrocarbons which, heated with the rubber, are effective to swell, disintegrate and/or devulcanize the rubber. In the method of the present invention the distillation pot temperature is raised to at least about 280° C. to drive off the volatile hydrocarbon fractions at the end of the process. As noted above, paving asphalts which contain significant quantities of volatile organic solvents are always undesirable from a health and safety point of view.

It is an object of the present invention to produce devulcanized rubber modified asphalt binders which can be made comparable in high temperature performance to regular high temperature performance grade asphalt binders while exhibiting significantly improved low temperature fracture toughness over unmodified binders.

It is a further object of the present invention to produce asphalt binders modified by rubber from waste automobile tires which is devulcanized in a non-oxidative process to improve on the long-term aging and fatigue performance characteristics of binders produced by processes using oxidation.

It is a further object of the present invention to provide a relatively simple and inexpensive process for producing devulcanized rubber modified asphalt binders.

It is a further object of the invention to provide a process for making such modified asphalt binders using distillation techniques which are conventionally used in the refining of crude oil to manufacture paving asphalt.

It is a still further object of the present invention to provide a process for making such modified asphalt binders which are substantially free of hazardous volatile organic solvents.

SUMMARY OF THE INVENTION

With a view to overcoming the aforementioned disadvantages of known processes for modifying asphalt binders and to achieving the aforementioned objects, the invention is in one aspect a process for obtaining a homogeneous, rubber-modified asphalt composition by mixing crude oil with particles of vulcanized or partially vulcanized rubber, distilling off fractions of the crude oil from the mixture until the pot temperature exceeds a temperature of between about 280° C. and 300° C., whereby substantially all of the vulcanized component of the rubber is devulcanized, and substantially all of the volatile low molecular weight hydrocarbon fraction of the crude oil have been removed, and mixing the pot residue from the distillation with asphalt in selected proportions to provide a homogeneous, rubber-modified asphalt composition containing a desired proportion of devulcanized rubber.

DETAILED DESCRIPTION OF THE INVENTION

In Tables I and II appearing and discussed below, comparative measurements of fracture toughness at −20° C. and of rheological data are made for two control asphalt binders, for a sample of commercially obtained ECOFLEX™ air-blown asphalt (Bitumar Inc., Montreal) and for five different rubber-modified asphalt compositions (binders) prepared according to the method of the invention and identified in experimental Examples 3, 6, 7, 9 and 10.

EXPERIMENTAL TECHNIQUES (i) Penetration Measurements

Penetration measurements were done according to ASTM standard test method D-5. The temperature conditioned samples were placed under a needle which was loaded with a 100 g weight and was subsequently allowed to penetrate the sample for 5 seconds. The reported value is the depth of penetration measured in increments of 0.1 mm.

(ii) Dynamic Mechanical Testing

Testing was done with a Rheometrics Dynamic Analyzer RDA II. Samples were heated until liquid, usually in the range of 130–140° C., poured into a Rheometrics combined melts and solids (CMS) test fixture. The CMS fixture consists of a 42 mm diameter cup and a bilevel plate which has an 8 mm diameter serrated surface concentric with and projecting from a 25 mm diameter plate. After filling the CMS fixture, it was allowed to cool to room temperature after which the sample was smoothed flat using a hot metal scraper, and allowed to cool again. No pretest conditioning of the sample was employed.

Data for the solid and the melt is obtained from the same sample by using the 8 mm surface of the plate below 40° C. and the 25 mm surface above this temperature. Curves for the inverse creep compliance, $|G^*|/\sin\delta$, were generated using programmed temperature sweeps at 10 rad/sec in the temperature range of interest. All data is calculated automatically by the RDA II Rheometrics asphalt analysis software using the input strain γ and asphalt analysis software using the input strain γ and strain angle, and the measured stress τ and stress angle[1].

(iii) Sample preparation for low temperature testing involved pouring hot liquid asphalt into a notched silicone rubber mold which was then cooled in a freezer for at least twelve hours. The samples were tested using a three point bending test based on ASTM test method E 399–90[2]. Testing was done in a liquid nitrogen cooled temperature chamber, maintained at −20° C., using a computer interfaced Sintech 2/G testing frame. The sample bars measured 25 mm wide by 12.5 mm deep by 175 mm long, and had a 90° starter notch 5 mm deep in their center which was sharpened with a razor blade just prior to testing. The length of the loading span was 100 mm.

A common assumption made to avoid the difficulties presented by viscoelasticity in the study of a viscoelastic composite material, especially at low strain rates, is that the composite adheres to the theory of linear elasticity. This is a valid assumption when the moduli of the matrix and the added polymer phase vary only slightly with time, however the approximation is not justified when either of the two components is near its glass transition. Since typical paving grade asphalts have a glass transition around 0° C. and the fracture tests are all performed at −20° C., the assumption of linear elasticity is not unreasonable.

Linear elastic fracture mechanics (LEFM) utilizes two main parameters: the critical stress intensity factor or fracture toughness, $K_{IC}$, and the fracture energy $G_{IC}$. Samples must be provided with a starter notch to ensure that cracking occurs in the right place. To ensure that plane-strain conditions exist at the crack tip it is necessary that the thickness be large with respect to the plastic zone size, otherwise plane-stress strain conditions were met under the described test conditions.

Brittle fracture studies were completed for different samples, including the 85–100 and 150–200 grade base asphalts, an ECOFLEX™ air blown asphalt produced by Bitumar, and devulcanized rubber modified binders developed by the inventors. Measured data included the failure load and the modulus, from which the fracture toughness and the fracture energy were calculated according to Formulae 1[3] and 2[4].

$$K_{Ic} = \frac{P_f S}{BW^{3/2}} \left[ \frac{3\left(\frac{a}{W}\right)^{1/2} \left[ 1.99 - \frac{a}{W}\left(1-\frac{a}{W}\right)\left(2.15 - 3.93\frac{a}{W} + 2.7\frac{a^2}{W^2}\right)\right]}{2\left(1+2\frac{a}{W}\right)\left(1-\frac{a}{W}\right)^{1/2}} \right] \quad \text{Formula (1)}$$

$$G_{Ic} \cong \frac{K_{Ic}^2}{E} \quad \text{Formula (2)}$$

Where;

$K_{IC}$=fracture toughness, N m$^{-3/2}$
$G_{IC}$=critical fracture energy, J m$^2$
$P_f$=applied failure load, N
S=loading span, m
B=specimen depth, m
W=specimen width, m
a=crack length, m
E=Young's Modulus, N m$^{-2}$ To calculate an accurate critical fracture energy, an additional term containing Poisson's ratio is needed. However, we have calculated an approximate fracture energy by omitting this term.

EXPERIMENTAL RESULTS

Examples 1 and 2 illustrate a high degree of devulcanization achieved by distillation of a mixture of crumb rubber and Mexican Crude Oil at two different rubber concentrations. Examples 4 and 5 likewise illustrate the devulcanization achieved by distilling mixtures of crumb rubber and Venezuelan Crude Oil.

Examples 3 and 6 describe the preparation of rubber-modified asphalt compositions according to the present invention, by the addition to a commercial asphalt binder of concentrated solutions of devulcanized rubber in crude oil which have been prepared by the distillation method of Examples 2 and 5, respectively.

It is a particular advantage of the process described in Examples 1-6 that topped crude distillation under vacuum conditions is one of the primary crude oil refining processes currently used for the manufacture of paving asphalt. Consequently, existing oil refinery equipment might readily be adapted for the fractional distillation of rubber/crude oil mixtures according to one embodiment of the method of the present invention.

Example 7 describes the preparation of a rubber-modified asphalt composition by the direct combination of crumb rubber with a softer grade (150–200 penetration grade) commercial asphalt binder, absent any added solvent, and heating the mixture to a temperature exceeding 300° C. with gentle stirring. This example and Example 8 illustrate the observed high degree of devulcanization and dissolution of rubber in asphalt at these elevated temperatures.

Examples 9 and 10 describe the preparation of a rubber-modified asphalt composition invention by the addition to a commercial asphalt binder of a concentrated solution of devulcanized rubber in asphalt, itself prepared by the method of Example 8.

Example 1

500 mL of Mexican Crude Oil (50% Ithsmas-50% Maya) was combined with 20.1 grams of 10 mesh cryogenically ground car tire and heated from room temperature at atmospheric pressure. The first fraction of distillate was removed at about 95° C. After 95 minutes, the temperature had risen to 322° C. and 170 mL of distillate had been removed. The mixture was filtered while hot through a 100 mesh stainless steel screen to determine the amount of undissolved rubber. After washing the residue with toluene and drying, the amount of rubber retained on the screen was determined to be 0.082 grams, which gives a 99.6% devulcanization yield.

Example 2

500 mL of Mexican Crude Oil (50% Ithsmas-50% Maya) was combined with 39.8 grams of 10 mesh cryogenically ground car tire and heated from room temperature at atmospheric pressure. The first fraction of distillate was removed at about 90° C. After 60 minutes, the temperature had risen to 315° C. and 155 mL of distillate had been removed. The system was then reduced to approximately 1 mm Hg pressure and heated further to 385° C., removing an additional 193 mL of distillate after 65 minutes. The mixture was filtered while hot through a 100 mesh stainless steel screen to determine the amount of undissolved rubber. After washing with toluene and drying, the amount of rubber retained on the screen was 0.070 grams, which gives a devulcanization yield of 9.8%. The penetration of the resulting asphalt was later measured to be 79.8 (0.1 mm/5 sec@100 gram) at 25° C.

Example 3

The mixture of Example 2 was diluted with straight 85–100 penetration grade asphalt binder to produce a mixture of which the dissolved rubber constitutes 10% by weight. Fracture toughness and rheological tests were completed on this material of which the results are given in Tables I and II.

Example 4

500 mL of Venezuelan Crude Oil (Menemota-Lago Treco) was combined with 39.9 grams of 10 mesh cryogenically ground car tire and heated from room temperature at atmospheric pressure. The first fraction of distillate was removed at about 110° C. After 35 minutes, the temperature had risen to 315° C. and 105 mL of distillate had been removed. The mixture was filtered while hot through a stainless steel screen to determine the amount of undissolved rubber. After washing with toluene and drying, the amount of rubber retained on the screen was 1.16 grams, which gives a devulcanization yield of 97.1%.

Example 5

500 mL of Venezuelan Crude Oil (Menemota-Lago Treco) was combined with 49.9 grams of 40 mesh wet ambiently ground car tire and heated from room temperature at atmospheric pressure. The first fraction of distillate was removed at 105° C. After 34 minutes, the temperature had risen to 315° C. and 108 mL of distillate had been removed. The pressure was then reduced to about 1 mm Hg and the mixture was heated further to 375° C., removing a further 201 mL of distillate after 103 minutes. The mixture was filtered while hot through a stainless steel screen to determine the amount of undissolved rubber. After washing with toluene and drying, the amount of rubber retained on the screen was 0.16 grams, which gives a devulcanization yield of 99.7%.

Example 6

The mixture from Example 5 was diluted with straight 85–100 penetration grade asphalt binder to produce a mixture of which the dissolved rubber constitutes 10% by weight. Fracture toughness and rheological tests were completed for this material of which the results are given in Tables I and II.

Example 7

645 grams of a 150–200 penetration grade asphalt binder was mixed with 64.5 grams of 10 mesh cryogenically ground car tire and heated to high temperature under gentle stirring. The temperature was maintained between 300 to 320° C. for one hour. The mixture was subsequently filtered while hot through a 100 mesh stainless steel screen to determine the amount of undissolved rubber. After washing with toluene and drying, it was determined that most of the rubber (>95%) had been devulcanized. Fracture toughness and rheological tests were completed for this material of which the results are given in Tables I and II.

Example 8

323 grams of a 150–200 penetration grade asphalt binder was heated with gentle stirring between 300 and 325° C. while 323 grams of 40 mesh wet ambiently ground car tire was added over two hours. Rapid dissolution of the rubber was observed above 310° C. Microscopic examination of the rubber-asphalt mixture at 400 times magnification showed that no crumb rubber particles were present after this treatment.

Example 9

A portion of the mixture of Example 8 was diluted with 150–200 penetration grade asphalt to produce a mixture containing 10% by weight dissolved rubber. Fracture toughness and rheological tests were completed for this material of which the results are given in Tables I and II.

Example 10

A portion of the mixture of Example 8 was diluted with a straight 85–100 penetration grade asphalt to produce a mixture containing 10% by weight dissolved rubber. Fracture toughness and rheological tests were completed for this material for which the results are given in Tables I and II.

TABLE I

FRACTURE TOUGHNESS DATA AT −20° C. FOR DEVULCANIZED RUBBER TIRE AND CONTROL ASPHALT BINDER SYSTEMS

| Sample | $K_{Ic}$, kN m$^{-3/2}$ | E, GPA | $G_{Ic}$, J m$^{-2}$ |
|---|---|---|---|
| 85–100 control | 44.1 | 1.35 | 1.44 |
| 150–200 control | 64.9 | 0.76 | 5.54 |
| ECOFLEX ™ | 55.8 | 1.14 | 2.73 |
| Example 3 | 96.7 | 1.23 | 7.60 |
| Example 6 | 81.6 | 1.05 | 6.34 |
| Example 7 | 72.9 | 0.67 | 8.00 |
| Example 9 | 102.0 | 0.75 | 13.97 |
| Example 10 | 121.2 | 1.26 | 11.66 |

TABLE II

RHEOLOGICAL DATA FOR ASPHALT BINDER SAMPLES

| Sample Compliance | Temperature, °C. | Inverse Creep (G*/sinδ, or 1/J"), kPa |
|---|---|---|
| 85–100 control | 52.9 | 4.430 |
| | 58.4 | 2.057 |
| | 64.5 | 0.984 |
| | 70.4 | 0.498 |
| 150–200 control | 52.6 | 1.954 |
| | 57.1 | 1.007 |
| | 64.5 | 0.425 |
| | 69.1 | 0.240 |
| ECOFLEX ™ | 52.4 | 5.964 |
| | 57.1 | 3.184 |
| | 64.2 | 1.496 |
| | 69.0 | 0.807 |
| Example 3 | 52.9 | 3.524 |
| | 57.0 | 1.896 |
| | 64.4 | 0.816 |
| | 70.2 | 0.419 |
| Example 6 | 51.9 | 2.514 |
| | 58.2 | 1.896 |
| | 64.2 | 0.816 |
| | 70.2 | 0.419 |
| Example 7 | 52.7 | 3.907 |
| | 57.3 | 1.998 |
| | 64.0 | 0.910 |
| | 69.1 | 0.479 |
| Example 9 | 52.0 | 3.008 |
| | 58.5 | 1.444 |
| | 64.4 | 0.734 |

TABLE II-continued

RHEOLOGICAL DATA FOR ASPHALT BINDER SAMPLES

| Sample Compliance | Temperature, °C. | Inverse Creep (G*/sinδ, or 1/J"), kPa |
|---|---|---|
| | 70.5 | 0.391 |
| Example 10 | 52.4 | 4.771 |
| | 57.2 | 2.432 |
| | 64.0 | 1.165 |
| | 69.0 | 0.622 |

The addition of rubber to asphalt has long been known to lower modulus and increase toughness at lower temperatures, but prior methods for homogeneously incorporating into asphalt vulcanized rubber from waste automobile tires have not been entirely satisfactory, as discussed above.

We have found that the distillation of a crude oil/crumb rubber mixture or the heating of an asphalt/crumb rubber mixture, at temperatures appreciably greater than those used in air-blowing or other preparatory methods, leads surprisingly to a high degree of devulcanization and compatabilization without the need for harsh oxidative treatments or solvents, with their attendant disadvantages.

We have observed that the devulcanization effect appears to begin to an appreciable degree in the aforementioned distillation or heating stages at temperatures of about 280° C. or greater, but may not proceed at sufficiently rapid rates until at least about 300° C. The high degree of devulcanization achieved at these elevated temperatures is shown in Examples 1, 2, 4 and 5 (distillation of crumb rubber/crude oil mixtures) and Examples 7 and 8 (heating of crumb rubber/unmodified asphalt mixtures).

For practical purposes, the method of the present invention will be carried out with proportions of starting material selected to give a final concentration of devulcanized rubber in the modified asphalt product of between about 3% and about 40%. At lower concentrations, the salutary effects of rubber addition are not significant, while at higher concentrations the process becomes uneconomical.

A comparison of low temperature (−20° C.) fracture toughness ($K_{IC}$) for various materials tested is given in the first data column of Table I. As defined in ASTM Method E 399-90, fracture toughness measures ". . . the resistance of a material to fracture in the presence of a sharp crack and under severe tensile constraint." Accordingly, it is reasonable to expect that binders with a higher fracture toughness will perform better in a pavement which is under stress from traffic induced loads and thermal contraction during fall and winter months. Of course, conclusive results may only be had by the actual construction of a test pavement section under tightly controlled circumstances, a test which would take several years to complete. Fracture toughness is, however, a fundamental material property and is believed to be a good measure for the resistance of binders to fracture. The increase in fracture toughness in Table I for Examples 3, 7, 9 and 10 is very substantial in comparison with the unmodified control asphalts and the ECOFLEX™ samples.

There is inherently something of a trade-off between high and low temperature performance of asphalt binders. In Table II, comparative measurements at several elevated temperatures, between about 50° C. and 70° C., are given for the same materials. A higher value of inverse creep compliance represents a higher resistance to deformation under stress. It will be seen that around 52° C. the ECOFLEX™ material exhibits a value of inverse creep compliance in (Kpa) of about 6, compared with values between 2.5 and 4.8 for modified binders according to the present invention. A proper comparison of the low temperature performance of asphalt would involve the comparison of materials having similar values of high temperature properties. The closest such comparison on the data obtained to date is between the ECOFLEX™ material and the modified binder of Example 10, which have comparable values of creep compliance at higher temperatures. However, the material prepared according to the invention has a fracture toughness at −20° C. which is more than twice as great as the ECOFLEX™.

It is well known in the art to subject rubber-modified asphalt compositions to chemical treatment to bring about still further improvement in the working properties of the binder, e.g. sulphur vulcanization of rubber in the homogenized composition to increase the inverse creep compliance (and hence the high-temperature performance) of the material. These and similar conventional post-formulation chemical treatments can be used with modified asphalt binders made according to the present invention as well. In that connection and in other respects it will be understood by those of ordinary skill in the art that the method of the invention is capable of modifications. Accordingly, the scope of the invention is to be found in the claims appended hereto rather than in the embodiments specifically described.

ENDNOTES

1. Owners Manual, Rheometrics Dynamic Analyzer RDA II, pp. 8–19 to 8–21, Rheometrics Inc., (1990).

2. Standard Test Method for PLANE-STRAIN FRACTURE TOUGHNESS OF METALLIC MATERIALS, ASTM METHOD E-399-90, American Society of Testing and Materials, Philadelphia (1992).

3. D. Broek, Elementary Engineering Fracture Mechanics, 3rd Revised Ed., Martinus Nijhoff, The Hague (1982) p. 171.

4. A. J. Kinloch, and R. J. Young, Fracture Behaviour of Polymers, Elsevier Applied Science, New York (1983) p. 93.

I claim:

1. A process for obtaining a homogeneous, rubber-modified asphalt composition comprising the steps of:

(a) preparing a mixture with crude oil of particles of rubber having a vulcanized component;

(b) distilling fractions of crude oil from said mixture until the final pot temperature exceeds about 280° C., whereby substantially all of said vulcanized component of the rubber has devulcanized and the volatile low molecular weight fraction of said crude oil has been removed; and (c) mixing the pot residue from step (b) with asphalt without any added solvent to form the homogeneous, rubber-modified asphalt composition.

2. A process according to claim 1, wherein said final pot temperature exceeds about 300° C.

3. A process according to claim 2, wherein said particles of rubber comprise ground rubber tire.

4. A process according to claim 3, wherein the relative proportions of pot residue formed in step (b) and of said asphalt are mixed in proportions to produce a composition including between about 3 and about 40 weight % of devulcanized rubber.

5. A process according to claim 3, wherein the homogeneous, rubber-modified asphalt composition, produced in step (b) is subsequently mixed with unmodified asphalt to produce a modified asphalt composition in which the final proportion of devulcanized rubber is between about 3 and about 40% by weight.

6. A process according to claim 4, wherein said asphalt has a penetration value of from about 85 to about 200.

* * * * *